United States Patent [19]
Stove

[11] Patent Number: 5,153,596
[45] Date of Patent: Oct. 6, 1992

[54] CW RADAR SYSTEM

[75] Inventor: Andrew G. Stove, Reigate, England

[73] Assignee: U.S. Philips Corporation, New York, N.Y.

[21] Appl. No.: 733,923

[22] Filed: Jul. 22, 1991

[30] Foreign Application Priority Data

Jul. 30, 1990 [GB] United Kingdom ............... 9016697

[51] Int. Cl.⁵ .................. G01S 7/35; G01S 13/32; H04B 1/48
[52] U.S. Cl. .................. 342/175; 342/198; 342/128; 342/200; 455/83
[58] Field of Search ........... 342/175, 128, 198, 122, 342/200; 455/81, 82, 83, 86

[56] References Cited

U.S. PATENT DOCUMENTS 3,019,430 1/1962 Pedersen et al. ............... 342/127 X
4,998,110 3/1991 Davis ............................ 342/175 X Primary Examiner—Gilberto Barrón, Jr.
Attorney, Agent, or Firm—Brian J. Wieghaus

[57] ABSTRACT

A continuous wave radar system comprises a transmitter section (1), a receiver section (2) and a common transmit/receive aerial (3). A directional coupler (12) is used to couple the transmitter section output (9) to the aerial (3) and to couple the aerial (3) to a first input (5) of a mixer (4) included in the receiver section (2). A second input (6) of the mixer (4) is fed with a reference signal from the transmitter section (1) via a fourth port (17) of the coupler (12), thereby usefully utilizing at least some of the transmitter power which would be wasted were the fourth port (17) merely terminated in a matched impedance.

6 Claims, 1 Drawing Sheet

CW RADAR SYSTEM

BACKGROUND OF THE INVENTION

This invention relates to a continuous-wave radar system having a transmitter section, a receiver section, and a transmit/receive aerial which is common to both of said sections, said receiver section including a mixer arrangement for mixing a signal derived from said aerial and applied to a first input thereof with a signal derived from said transmitter section and applied to a second input thereof, the system including a directional coupler which couples an output of said transmitter section to said aerial via a signal path within said coupler from a first port to a second port thereof and couples said aerial to said first input via a signal path within said coupler from said second port to a third port thereof, the transmitter section output also being coupled to said second input.

Continuous-wave radar systems are well-known and discussed in many text-books. A continuous RF signal from a transmitter section is radiated from an aerial and, if it should encounter a reflecting target, the reflected signal received by the system is mixed in a receiver section with a sample of the currently transmitted signal. The result of the mixing process contains information about the range and/or the velocity of the target. Thus, for example, if the radiated signal has a constant frequency the reflected signal may have a different frequency to the radiated signal due to the Doppler effect, so that the result of the mixing process is a beat frequency signal having a frequency which is representative of the relative velocity of the radar system and the target. As another example the reflected signal received at any given time may have a different frequency to that currently being radiated, due to frequency sweeps being imparted to the radiated signal and the finite time delay occurring between radiation of the signal and reception of the reflected same signal. In this case the result of the mixing process is again a beat frequency signal the frequency of which is now, for zero relative velocity between the radar system and the target, representative of the range of the target.

Some of the known systems employ separate aerials for transmission and reception, this assisting in the avoidance of excessive breakthrough of the transmitted signal into the receiver section (where it would be liable to give rise to excessive noise and even damage). However from the point of view of economy and/or compactness it is desirable to use a common aerial for both transmission and reception, and this is done in other known systems, further measures then being taken to avoid excessive breakthrough of the transmitted signal into the receiver section. The general set-up in the latter case is shown in FIG. 1 of the accompanying diagrammatic drawings. In FIG. 1 a (known) continuous-wave radar system has a transmitter section 1, a receiver section 2, and a transmit/receive aerial 3 which is common to both of the sections 1 and 2. The receiver section 2 includes a mixer arrangement 4 for mixing a signal derived from the aerial 3 and applied to a first input 5 thereof with a signal derived from the transmitter section 1 and applied to a second input 6 thereof. The output 7 of the mixer 4 is fed to a signal processing arrangement 8 which also forms part of the receiver section 2. The manner in which the processing arrangement 8 operates is irrelevant in the present context and will therefore not be discussed. An output 9 of the transmitter section 1 (which section basically comprises a continuous-wave r.f. signal generator) is coupled to the aerial 3 via a first port 10 and a second port 11 of a device 12 and a signal path 15 within the device 12 from the port 10 to the port 11. Moreover the aerial 3 is coupled to the input 5 of mixer 4 via the port 11 and a third port 13 of the device 12 and a signal path 16 within the device 12 from the port 11 to the port 13. The output 9 of the transmitter section 1 is also coupled to the second input 6 of mixer 4 via a directional coupler 14, so that a portion of the output signal of transmitter section 1 is fed to the mixer input 6.

As discussed, for example, on pages 71-72 of the book "Introduction to Radar Systems" by M. Skolnik (2nd edition), device 12 serves to provide some degree of isolation of the input 5 of mixer 4 from the output signal of the transmitter section 1. To this end it may be formed by, for example, a hybrid junction or a circulator. A circulator has the advantage that it can be made to direct substantially the whole of the signal power applied to its port 10 from the transmitter section output 9 to its port 11 and thence to the aerial 3, and to direct substantially the whole of the signal power applied to its port 11 from the aerial 3 to its port 13 and thence to the mixer input 5, with the result that minimal signal power need be wasted. However circulators are difficult to set up and difficult to integrate with other microwave components. On the other hand a hybrid junction (which is a four terminal-pair device which ideally has the property that power supplied to a given terminal is divided, usually equally, between two of the three remaining terminal pairs and nothing is coupled to the fourth terminal-pair and which may be constituted, for example, by a 3 dB directional coupler with a symmetrical coupling element) while being easier to set up and integrate, inherently results in a waste of power if used as the device 12 of FIG. 1. Energy from the transmitter section 1 will divide equally between the aerial 3 and the matched termination on the otherwise unused arm of the device 12, whereas energy received by the aerial 3 will divide equally between the mixer input 5 and the transmitter section 1. Thus there will be a minimum loss of 6 dB of signal power (3 dB on transmission and 3 dB on reception) as mentioned in the part of the Skolnik book referred to above and also, for example, on page 890 of the book "Microwave Engineering" by A. F. Harvey (1963). It is an object of the invention to enable this minimum loss to be reduced without it being necessary to employ a circulator.

SUMMARY OF THE INVENTION

To this end the invention provides a system as defined in the first paragraph which is characterized in that the transmitter section output is coupled to said second input via a signal path within said coupler from said first port to a fourth port thereof.

It has now been recognised that, when a directional coupler with one arm terminated in a matched impedance is employed as the device 12 of FIG. 1, at least some of the energy dissipated in the matched impedance could in fact be usefully employed to drive the input 6 of the mixer 4 instead, in the process making the coupler 14 redundant. If all this energy is so employed the minimum energy loss will be reduced to the 3 dB minimum loss occurring on reception (assuming the coupling coefficient of the coupler is 3 dB).

BRIEF DESCRIPTION OF THE DRAWING

An embodiment of the invention will now be described, by way of example, with reference to FIG. 2 of the accompanying diagrammatic drawings, in which drawings

Corresponding components have been given the same reference numerals in the two Figures, where, appropriate.

DESCRIPTION OF THE PREFERRED EMBODIMENTS

Figure 1:
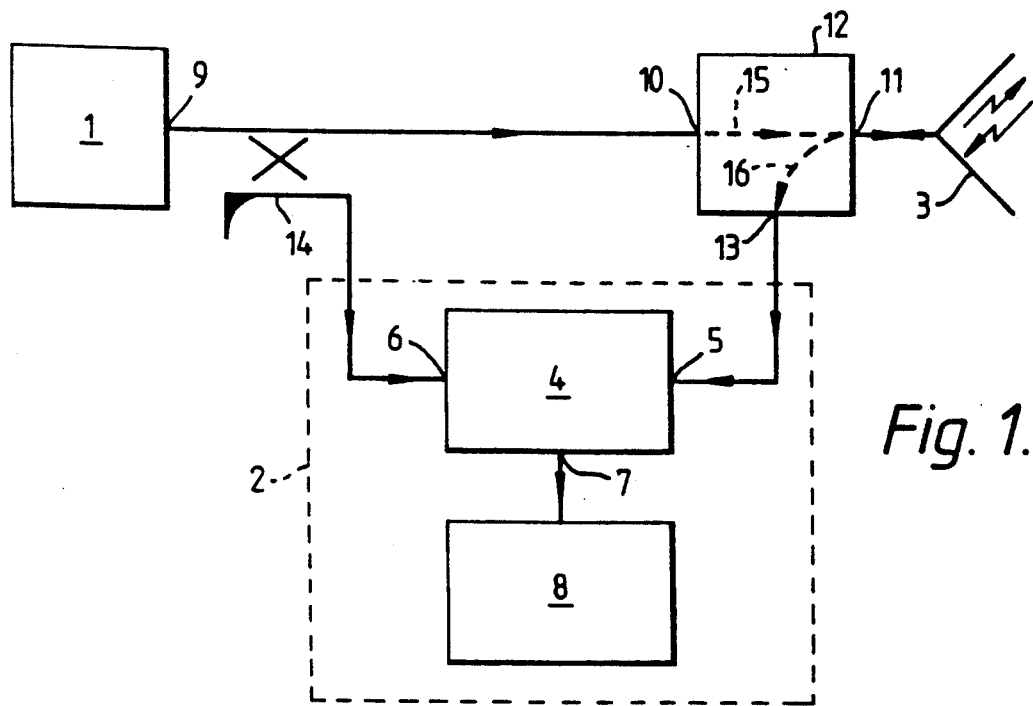
FIG. 1 is a block diagram of the general set-up of a known continuous-wave radar system as discussed previously.
Figure 2:
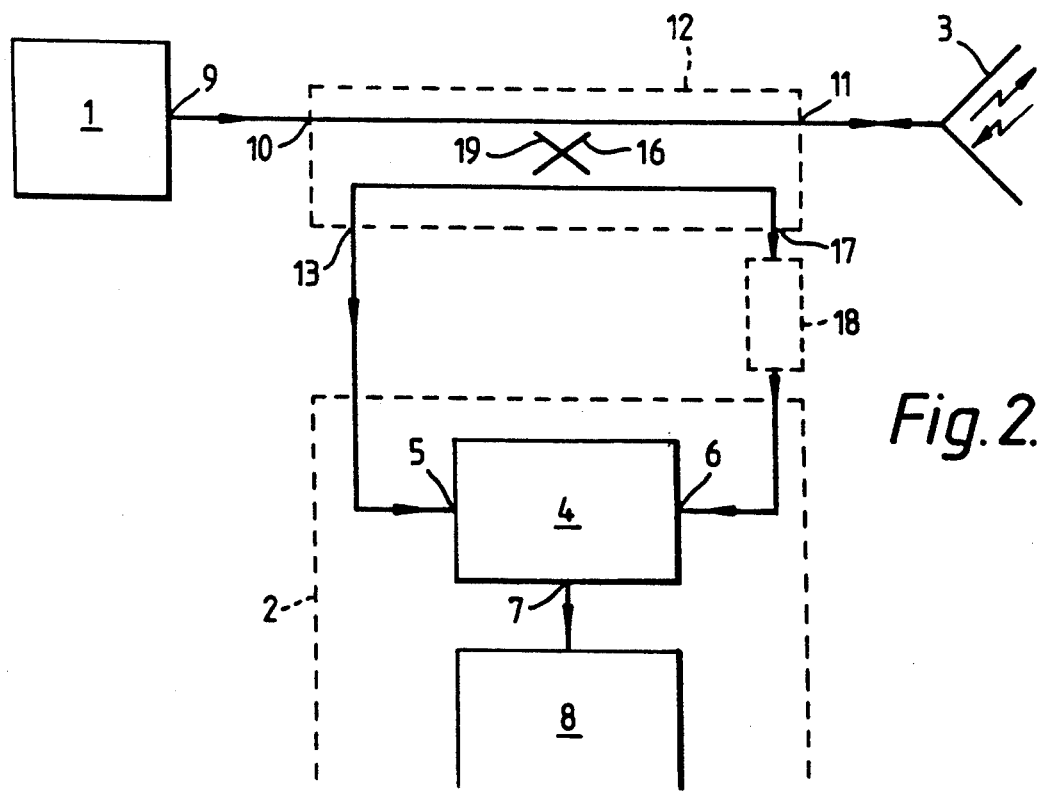
FIG. 2 is a block diagram of the general set-up of the exemplary embodiment of the invention.

In FIG. 2 a continuous-wave radar system comprises, like that described with reference to FIG. 1, a transmitter section 1, a receiver section 2, a common transmit/-receive aerial 3, and a device 12, the receiver section 2 again comprising a mixer 4 and a processing arrangement 8. The device 12 takes the form of a directional coupler having first, second, third and fourth ports 10,11,13 and 17 respectively, the second input 6 of the mixer 4 being fed from the fourth port 17 rather than from a further directional coupler as shown at 14 in FIG. 1. If desired an attenuator 18 (shown in dotted lines) may be included in the coupling from the port 17 to the input 6. The output 9 of the transmitter section 1 is coupled to the aerial 3 via the ports 10 and 11 of the coupler 12 and a first signal path 15 within the coupler from the port 10 to the port 11. The aerial 3 is coupled to the first input 5 of the mixer 4 via the ports 11 and 13 of the coupler 12 and a second signal path 16 within the coupler from the port 11 to the port 13. Now the transmitter section output 9 is coupled to the second input 6 of the mixer 4 via the attenuator 18 (if present), the first port 10 and the fourth port 17 of the coupler 12 and a third signal path 19 within the coupler from the port 10 to the port 17. Thus the transmitter power which will have been dissipated in a matched termination when a directional coupler-type hybrid junction was used for the device 12 in FIG. 1, an additional amount being taken off via the coupler 14 to drive the second input 6 of mixer 4, is now itself used wholly or partly (depending on whether attenuator 18 absent or present) to drive the second input 6 of mixer 4. In the absence of the attenuator 18 there is therefore no longer any inherent loss in transmitter energy, although the 3 dB (assuming coupler 12 is a 3 dB coupler) inherent loss of received energy remains due to the division of this received energy by the coupler between its ports 10 and 13.

Whether or not attenuator 18 is provided will depend on the particular circumstances, i.e. on whether or not the output power of transmitter section 1 is greater than twice the power required to drive the input 6 of mixer 4 (again assuming that coupler 12 is a 3 dB coupler).

If the required transmitted power is less than the power required to drive the second input 6 of mixer 4 the coupling factor of coupler 12 may of course be increased so that the required ratio between these two powers is obtained. This will result in an increased proportion of received energy being fed to the first input 5 of mixer 4 and hence in a reduced overall energy loss.

In a particular implementation operating at 94 GHz coupler 12 was of the well-known multi-hole type, the number of holes being chosen to give a coupling coefficient of 3 dB.

From reading the present disclosure, other modifications will be apparent to persons skilled in the art. Such modification may involve other features which are already known in the design, manufacture and use of radar systems and component parts thereof and which may be used instead of or in addition to features already described herein.

I claim:

1. A continuous-wave radar system having a transmitter section with a transmitter output, a receiver section, a transmit/receive aerial which is common to both of said transmitter and receiver sections, said receiver section including a mixer arrangement for mixing a signal derived from said aerial and applied to a first mixer input thereof with a signal derived from said transmitter section and applied to a second mixer input thereof, and a directional coupler for coupling said transmitter output to said aerial via a signal path within said coupler from a first coupler port to a second coupler port thereof, for coupling said aerial to said first mixer input via a signal path within said coupler from said second coupler port to a third coupler port thereof, and for coupling said transmitter output to said second mixer input, characterized in that: said directional coupler includes a fourth coupler port, and said transmitter output is coupled to said second mixer input via a signal path within said coupler from said first coupler port to said fourth coupler port.

2. A system as claimed in claim 1, wherein said directional coupler is a 3 dB coupler.

3. A continuous wave radar system, comprising:
    (a) an antenna for receiving and transmitting signals;
    (b) transmitter means, having a transmitter output, for transmitting signals over said antenna;
    (c) receiver means for receiving signals from said antenna, said receiver means comprising mixer means having first and second inputs for mixing a signal derived from said antenna and applied to said first mixer input with a signal derived from said transmitter output and applied to said second mixer input; and
    (d) a hybrid junction directional coupler having four ports and first, second, and third internal signal paths connected between first and second, second and third, and first and fourth of said ports respectively, said transmitter output being coupled to said antenna via said first and second ports and said first signal path and to said second mixer input via said first and fourth ports and said third signal path, and said antenna being coupled to said first mixer input via said second and third ports and said second signal path.

4. A continuous wave radar system according to claim 3, wherein said directional coupler is a 3 dB coupler.

5. A continuous wave radar system according to claim 4, further comprising an attenuator connected between said transmitter output and said second mixer input.

6. A continuous wave radar system according to claim 3, further comprising an attenuator connected between said transmitter output and said second mixer input.

* * * * *